US012662427B2

(12) United States Patent (10) Patent No.: US 12,662,427 B2
Wambaugh et al. (45) Date of Patent: Jun. 23, 2026

(54) CEMENTITIOUS CONSTRUCTION MATERIAL CONTAINING MAGNESIUM OXYCHLORIDE CRYSTALS

(71) Applicant: TRITON MGO PRODUCTS, LLC, Houston, TX (US)

(72) Inventors: James A. Wambaugh, Houston, TX (US); Christopher L. Kitchens, Houston, TX (US)

(73) Assignee: Triton MgO Products, LLC, Houston, TX (US)

( * ) Notice: Subject to any disclaimer, the term of this patent is extended or adjusted under 35 U.S.C. 154(b) by 581 days.

(21) Appl. No.: 17/817,313

(22) Filed: Aug. 3, 2022

(65) Prior Publication Data

US 2023/0047741 A1 Feb. 16, 2023

Related U.S. Application Data

(60) Provisional application No. 63/228,872, filed on Aug. 3, 2021.

(51) Int. Cl.
*C04B 28/32* (2006.01)
*B32B 13/02* (2006.01)
(Continued)

(52) U.S. Cl.
CPC .............. *C04B 28/32* (2013.01); *B32B 13/02* (2013.01); *B32B 13/04* (2013.01); *C04B 14/386* (2013.01);
(Continued)

(58) Field of Classification Search
None
See application file for complete search history.

(56) References Cited

U.S. PATENT DOCUMENTS

| | | | |
|---|---|---|---|
| 1,019,083 A | 3/1912 | Pink | |
| 1,811,799 A | 6/1931 | Lukens | |

(Continued)

FOREIGN PATENT DOCUMENTS

| | | |
|---|---|---|
| CN | 1049838 A | 3/1991 |
| CN | 1092051 A | 9/1994 |

(Continued)

OTHER PUBLICATIONS

Molecule of the Week Archive Sodium stearate, Nov. 9, 2020. (Year: 2020).*

(Continued)

*Primary Examiner* — David Sample
(74) *Attorney, Agent, or Firm* — Stinson LLP

(57) ABSTRACT

The present invention generally relates to cementitious material that is a precursor of a magnesium oxychloride cement (MOC) and comprises treated carbon fibers comprising a dispersing agent at least partially coating the carbon fibers and processes for the preparation thereof. The present invention is also related to cementitious material that is a precursor of a magnesium oxychloride cement (MOC) and comprises siliconate and processes for the preparation thereof. The present invention further relates to cementitious material (e.g., pourable, extrudable, moldable and formable cementitious material) and cementitious construction material (e.g., boards, structural laminates, etc.) formed from curing the cementitious material.

18 Claims, 2 Drawing Sheets

(51) Int. Cl.

| | |
|---|---|
| *B32B 13/04* | (2006.01) |
| *C04B 14/38* | (2006.01) |
| *C04B 20/10* | (2006.01) |
| *C04B 22/16* | (2006.01) |
| *C04B 40/00* | (2006.01) |
| *C04B 111/00* | (2006.01) |
| *C04B 111/60* | (2006.01) |

(52) U.S. Cl.

CPC ........ *C04B 20/1018* (2013.01); *C04B 22/165* (2013.01); *C04B 40/0046* (2013.01); *B32B 2250/40* (2013.01); *B32B 2262/106* (2013.01); *B32B 2262/16* (2021.05); *B32B 2419/04* (2013.01); *C04B 2111/00612* (2013.01); *C04B 2111/60* (2013.01); *C04B 2201/20* (2013.01)

(56) References Cited

U.S. PATENT DOCUMENTS

| | | | |
|---|---|---|---|
| 1,853,522 A | 4/1932 | Stewart | |
| 2,351,641 A | 6/1944 | Sohl et al. | |
| 2,543,959 A | 3/1951 | Eastin | |
| 2,692,219 A | 10/1954 | Slayter et al. | |
| 2,702,753 A | 2/1955 | Dickey | |
| 3,320,077 A | 5/1967 | Prior | |
| 4,141,744 A | 2/1979 | Prior et al. | |
| 4,158,570 A | 6/1979 | Iwrin | |
| 4,352,694 A | 10/1982 | Smith-Johannsen | |
| 4,613,627 A | 9/1986 | Sherman et al. | |
| 4,983,457 A | 1/1991 | Hino et al. | |
| 5,130,184 A | 7/1992 | Ellis | |
| 5,434,200 A | 7/1995 | Kolke et al. | |
| 5,603,168 A | 2/1997 | McMahon, Jr. | |
| 5,652,058 A * | 7/1997 | Nagata ................ C04B 20/1037 |
| | | | 106/713 |
| 6,200,381 B1 | 3/2001 | Rechichi | |
| 6,319,579 B1 | 11/2001 | Strandgaard | |
| 7,255,907 B2 | 8/2007 | Feigin et al. | |
| 7,595,092 B2 | 9/2009 | Huddy et al. | |
| 7,867,597 B2 | 1/2011 | Feigin et al. | |
| 7,921,800 B2 | 4/2011 | Huddy et al. | |
| 7,998,547 B2 | 8/2011 | Feigin et al. | |
| 8,066,812 B2 | 11/2011 | Wu et al. | |
| 8,181,580 B2 | 5/2012 | Roth et al. | |
| 8,603,237 B2 | 12/2013 | Rademan et al. | |
| 8,959,861 B1 | 2/2015 | Wambaugh et al. | |
| 10,167,230 B1 | 1/2019 | Wambaugh et al. | |
| 10,167,231 B1 | 1/2019 | Wambaugh et al. | |
| 10,167,232 B1 | 1/2019 | Wambaugh et al. | |
| 10,227,259 B1 | 3/2019 | Wambaugh et al. | |
| 10,897,222 B2 | 1/2021 | Wambaugh et al. | |
| 11,117,836 B2 | 9/2021 | Wambaugh et al. | |
| 2004/0126602 A1 | 7/2004 | Wallner | |
| 2006/0070321 A1 | 4/2006 | Au | |
| 2008/0275149 A1 | 11/2008 | Ladely et al. | |
| 2009/0065972 A1 | 3/2009 | Feigin et al. | |
| 2011/0088597 A1 | 4/2011 | Wu et al. | |
| 2011/0108241 A1 | 5/2011 | Driscoll et al. | |
| 2012/0171429 A1 | 7/2012 | Man et al. | |
| 2013/0256578 A1 | 10/2013 | Li et al. | |
| 2013/0263759 A1 | 10/2013 | Rademan | |
| 2016/0304396 A1 | 10/2016 | Shand et al. | |
| 2017/0283324 A1 | 10/2017 | Cui | |
| 2018/0036911 A1 | 2/2018 | Dubey et al. | |
| 2018/0036912 A1 | 2/2018 | Dubey et al. | |
| 2019/0341875 A1 * | 11/2019 | Wambaugh ............. H02S 10/10 |
| 2019/0379319 A1 | 12/2019 | Wambaugh et al. | |
| 2020/0181023 A1 | 6/2020 | Wambaugh et al. | |
| 2024/0025809 A1 | 1/2024 | Wambaugh et al. | |

FOREIGN PATENT DOCUMENTS

| | | | | |
|---|---|---|---|---|
| CN | 2189528 Y | 2/1995 | | |
| CN | 1262171 A | 8/2000 | | |
| CN | 1415574 A | 5/2003 | | |
| CN | 1450017 A | 10/2003 | | |
| CN | 1456528 A | 11/2003 | | |
| CN | 101857414 A | 10/2010 | | |
| CN | 102464482 A | 5/2012 | | |
| CN | 102838341 A | 12/2012 | | |
| CN | 103553410 A | 2/2014 | | |
| CN | 105036578 A | 11/2015 | | |
| CN | 105272134 A | 1/2016 | | |
| CN | 104609752 A | 4/2017 | | |
| CN | 107673727 A | 2/2018 | | |
| DE | 102012000468 A1 * | 7/2013 | .......... | B32B 27/304 |
| EP | 0045162 A1 | 2/1982 | | |
| EP | 2011838 A1 | 1/2009 | | |
| GB | 638926 A | 6/1950 | | |
| JP | 03150241 A * | 6/1991 | | |
| JP | 2019094243 A | 6/2019 | | |
| WO | 199011976 A1 | 10/1990 | | |
| WO | 2003043947 A2 | 5/2003 | | |
| WO | 2008063904 A2 | 5/2008 | | |
| WO | 2013151819 A1 | 10/2013 | | |
| WO | 2019240838 A1 | 12/2019 | | |
| WO | 2020093111 A1 | 5/2020 | | |

OTHER PUBLICATIONS

Aiken et al., "Magnesium Oxychloride Boards: Understanding a Novel Building Material," Materials and Structures (2020) 53:118, https://doi.org/10.1617/s11527-020-01547-z, 16 pages.

Chen Xuefei et al., "Research on the Mechanism of Water Resistance of Magnesium Oxychloride Concrete with Phosphoric Acid," Concrete, pp. 68-71, Feb. 28, 2018, 4 pages.

ASTM E136 (Standard Test Method for Assessing Combustibility of Materials Using a Vertical Tube Furnace at 750° C., as defined in the 2012, 2015 and 2018 IBC Model Codes). 2 Scope pages.

Deng, Dehua, "The formation mechanism of the hydrate phases in magnesium oxychloride cement," Cement and Concrete Research, vol. 29, 1999, pp. 1365-1371.

Deng, Dehua, "The mechanism for soluble phosphates to improve the water resistance of magnesium oxychloride cement," Cement and Concrete Research, vol. 33, 2003, pp. 1311-1317.

Feng et al., "Research on improving the water resistance of magnesium oxychloride cement," Gongneng Cailiao/Journal of Functional Materials, vol. 46, Issue 17, 2015, pp. 17038-17041 and 17045, Abstract only.

Gochez et al., "(174h) Microstructure Characterization of Magnesium Oxide-Based Wallboard Composites for Enhanced Structural Properties and Fire/Water Resistance," 2014 AIChE Annual Meeting, Materials Engineering and Sciences Division, Characterization of Composites, 4 pages, <https://www.aiche.org/conferences/aiche-annual-meeting/2014/proceeding/paper/174h-microstructure-characterization-magnesium-oxide-based-wallboard-composites-enhanced-structural-1>.

Li et al., "The influence of compound additive on magnesium oxychloride cement/urban refuse floor tile," Construction and Building Materials, vol. 22, Issue 4, Apr. 2008, pp. 521-525, Abstract only.

Tan et al., "Effect of phosphoric acid on the properties of magnesium oxychloride cement as a biomaterial," Cement and Concrete Research, vol. 56, 2014, pp. 69-74.

Walling et al., "Magnesia-Based Cements: A Journey of 150 Years, and Cements for the Future?," Chem. Rev. vol. 116, 2016, pp. 4170-4204.

Tadele, T., Analysis of Fillers for Production of Alternative Building Materials Using Magnesia Cement, Jan. 2008, Addis Ababa University, 98 pages.

Li, Y. et al. "The influence of FeSO4 and KH2PO4 on the performance of magnesium oxychloride cement". Construction and Building Materials 102 (2016) 233-238. (Year: 2016).

* cited by examiner

100

115

103

101

109

105

120

CEMENTITIOUS CONSTRUCTION MATERIAL CONTAINING MAGNESIUM OXYCHLORIDE CRYSTALS

FIELD OF THE INVENTION

The present invention generally relates to cementitious material that is a precursor of a magnesium oxychloride cement (MOC) and comprises treated carbon fibers comprising a dispersing agent at least partially coating the carbon fibers and processes for the preparation thereof. The present invention is also related to cementitious material that is a precursor of a magnesium oxychloride cement (MOC) and comprises a siliconate and processes for the preparation thereof. The present invention further relates to cementitious material (e.g., pourable, extrudable, moldable and formable cementitious material) and cementitious construction material (e.g., boards, structural laminates, etc.) formed from curing the cementitious material.

BACKGROUND OF THE INVENTION

MOC is a crystalline ceramic material suitable for use as a structural construction material. MOC for structural applications has the stoichiometric formula $Mg_3(OH)_5Cl \cdot 4H_2O$ and is known as 5-phase MOC. Generally, 5-phase MOC is prepared by mixing magnesium oxide (MgO), magnesium chloride ($MgCl_2$), and water in a stoichiometric molar ratio of 5:1:13, respectively.

Previously, MOC exhibited low water stability and thus had not been the subject of widespread adoption for use in construction materials. Recently, cementitious construction material, methods for the preparation thereof, and its use in certain applications such as in tile backer board have been developed as described in U.S. Pat. Nos. 10,167,230; 10,167,231; 10,167,232; and 10,227,259. These patents describe MOC exhibiting various advantageous properties, including water stability, in particular warm water stability and therefore are particularly suitable for use in construction in warm weather and hurricane susceptible areas. These construction materials are also fire resistant.

However, a need exists for continued improvements in MOC and MOC-containing cementitious materials and cementitious construction materials as their adoption for use in various constructions applications expands.

BRIEF SUMMARY OF THE INVENTION

One embodiment of the present invention is directed to a cementitious construction material, the cementitious construction material comprising magnesium oxychloride crystals and treated carbon fibers comprising a dispersing agent at least partially coating the carbon fibers.

Another embodiment of the present invention is directed to a cementitious construction material, the cementitious construction material comprising magnesium oxychloride crystals and a siliconate.

Certain embodiments of the present invention are directed to a process for making a cementitious material. The process comprises blending magnesium oxide and a magnesium chloride solution, thereby reacting the magnesium oxide and magnesium chloride and forming a liquid mixture; blending treated carbon fibers comprising a dispersing agent at least partially coating the carbon fibers into the liquid mixture, thereby dispersing the treated carbon fibers throughout the liquid mixture; mixing the liquid mixture containing the treated carbon fibers until a target density of the liquid mixture of is reached; and adding a stabilizing material to the liquid mixture, wherein the stabilizing material is selected from the group consisting of an aqueous solution comprising phosphorous acid ($H_3PO_3$), an aqueous solution comprising phosphoric acid ($H_3PO_4$), or combinations thereof.

Other embodiments of the present invention are directed to a process for making a cementitious material comprising: blending magnesium oxide and a magnesium chloride solution, thereby reacting the magnesium oxide and magnesium chloride and forming a liquid mixture; introducing a siliconate and a stabilizing material into the liquid mixture; and mixing the liquid mixture containing the siliconate and the stabilizing material until a target density of the liquid mixture of is reached.

In one embodiment of the present invention a multi-layer structural construction material is disclosed. The material comprises a first layer constructed of cementitious construction material comprising magnesium oxychloride crystals and having an outer surface, an inner surface, and at least one edge between the outer surface and inner surface; a second layer constructed of cementitious construction material comprising magnesium oxychloride crystals and treated carbon fibers comprising a dispersing agent at least partially coating the carbon fibers having a first inner surface, a second inner surface and at least one edge between the inner surfaces; and a third layer constructed of cementitious construction material comprising magnesium oxychloride crystals and having an outer surface, an inner surface and at least one edge between the outer surface and the inner surface. The second layer is disposed between the first layer and the third layer. The inner surface of the first layer covers the first inner surface of the second layer and the inner surface of the third layer covers the second inner surface of the second layer. The cured density of the cementitious construction material of the second layer is less than the cured density of the cementitious construction material of the first layer and the third layer.

Another embodiment of the present invention is directed to a flooring laminate. The flooring laminate comprises a core layer having a first surface having a length and a width, a second surface having a length and a width, and at least one edge extending between the first surface and the second surface, wherein the core layer comprises a cementitious board comprising magnesium oxychloride crystals and treated carbon fibers comprising a dispersing agent at least partially coating the carbon fibers, wherein the cementitious board has a density of from about 0.6 g/mL to about 1.3 g/mL; and a decorative layer secured to the first surface of the core layer.

In other embodiments of the present invention, a cementitious material is disclosed comprising magnesium oxychloride crystals at least partially surrounded by a phosphorus-containing layer, the cementitious material comprising treated carbon fibers comprising a dispersing agent at least partially coating the carbon fibers.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION OF THE INVENTION

Figure 1:
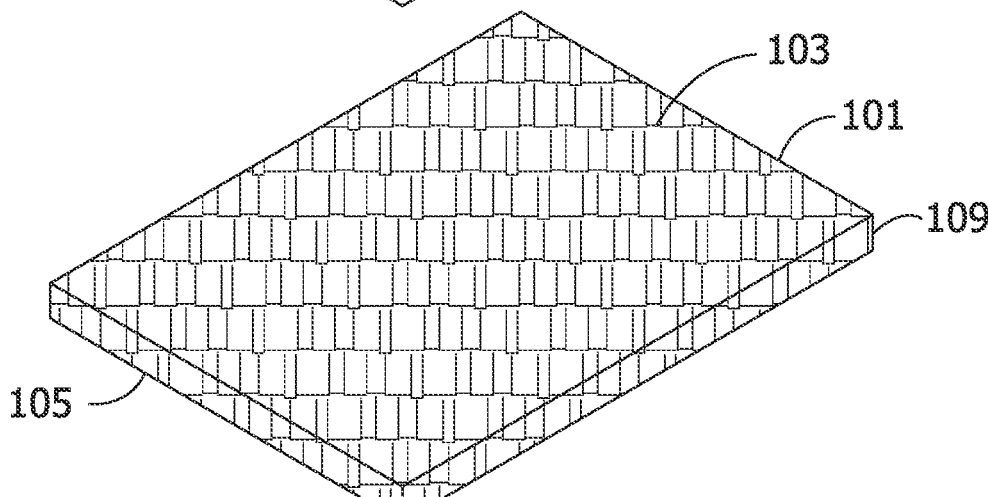
FIGS. 1 and 2 depict construction material in accordance with the present invention.
Figure 1:
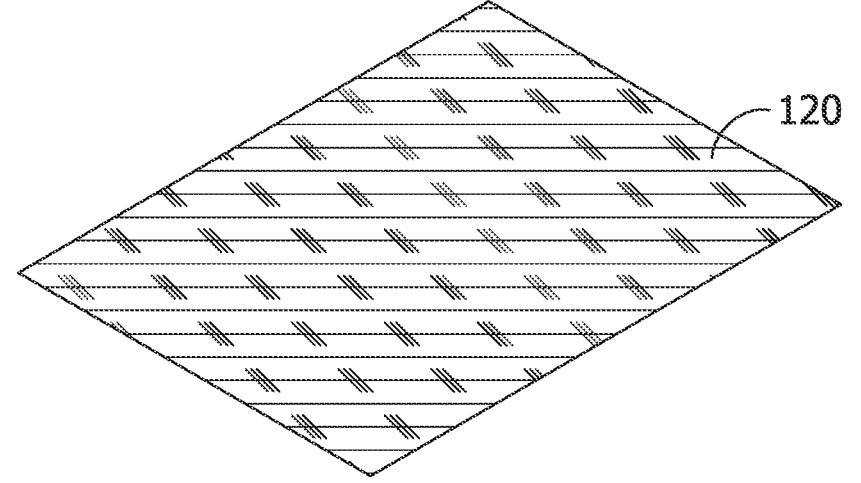

The present invention relates to cementitious material that is a precursor of magnesium oxychloride cement (MOC) and cementitious construction material comprising MOC and processes for their preparation.

Previous cementitious construction materials, such as those made using Portland cement, are typically formed via a hydration reaction comprising combining calcium oxide (i.e., hydraulic lime) and water to form a paste that coats particles of stone and sand. To prepare a suitable construction material, the product of the hydration reaction must be dried to remove excess water and form a suitable solid product.

In contrast, the process of preparing magnesium oxychloride cement involves combining and reacting magnesium oxide and magnesium chloride to form an amorphous phase, followed by introducing a phosphorus-containing stabilizing material. Curing the cementitious material then actuates crystallization of a portion of the amorphous phase, while simultaneously forming a nano-molecular veneer encapsulating the crystallized portion of the amorphous phase. The cementitious construction material (e.g., a board or other structural component) formed upon curing of the cementitious material comprises magnesium oxychloride crystals, including those having a phosphorus-containing layer thereon. Further, magnesium oxychloride cement also exhibits a more neutral pH than those typically observed in traditional (e.g., Portland) concretes.

These differences from conventional cementitious construction materials present the skilled person with unique challenges and considerations when attempting to utilize magnesium oxychloride cement in the preparation of construction materials. For example, solid reinforcing components (e.g., carbon fibers) added to the mixture for improved mechanical strength characteristics in magnesium oxychloride cementitious construction materials are often hydrophobic and difficult to uniformly distribute throughout the cement mixture, undermining their effectiveness. Further, it is often desired to control the density exhibited by the cementitious construction material, including reducing the density to produce a lighter material that is easier to handle and manipulate. Any solution to the problems of providing improved mechanical strength and/or density control in magnesium oxychloride cementitious construction materials must not appreciably interfere with the reaction between magnesium oxide and magnesium chloride nor inhibit formation of the crystalline structures or a nano-molecular veneer. As described in detail below, solutions to these problems and other benefits are provided by utilizing a dispersing agent and/or a siliconate component in the preparation of the magnesium oxychloride cementitious material.

The cementitious material and cementitious construction material of the present invention are generally in the form of those described in U.S. Pat. Nos. 10,167,230; 10,167,231; 10,167,232; and 10,227,259, the entire contents of which are incorporated by reference herein for all relevant purposes, with certain properties enhanced based on the presence of carbon fibers, a dispersing agent, and/or a siliconate component.

In one embodiment of the present invention, carbon fibers are incorporated into the cementitious material providing various advantages as detailed herein. The carbon fibers utilized in accordance with the present invention are typically treated carbon fibers in the form of carbon fibers having a dispersing agent at least partially coating the carbon fibers. The dispersing agent aids in compatibilizing and distributing the hydrophobic carbon fibers throughout the mass of cementitious material, thus providing the advantage of incorporating the fibers throughout the entire cementitious material and eventual cementitious construction material. Incorporation of the carbon fibers throughout the entire cementitious material has been observed to provide the cementitious construction material with numerous advantageous properties. For example, improvements in bulk and specific strength properties, including flexural strength and lateral screw pull strength. Additionally, the cementitious construction material of the present invention was found to have improved bulk and specific nail pull strength. Further advantageous, and surprising, was the discovery that incorporating treated carbon fibers provides a cementitious material with these advantageous strength properties while being of lower density and/or weight. Accordingly, the carbon fiber-containing cementitious construction materials of the present invention provide the required structural performance while being lighter and therefore easier to handle and manipulate. This increase in performance with treated carbon fibers was unexpected. In particular, it was discovered that treated carbon fibers achieved greater property enhancements (i.e., lower density and necessary structural performance) as compared to an embodiment incorporating carbon fibers and a dispersing agent separately, at the same carbon fiber loading. A further benefit of a lighter cementitious construction material of the present invention is the reduced cost associated with transportation, storage, etc.

Further, as detailed elsewhere herein, the advantageous combination of strength and low weight allows for preparing cementitious construction materials containing multiple layers of MOC having different weight/densities. Generally speaking, these materials with different layers, or regions of different properties are prepared by combining MOC-containing cementitious materials prepared as described above, for example, with and without carbon fibers. The multiple materials are combined prior to and/or during the curing process to provide the construction material. For example, an inner layer, or region of MOC-containing cementitious materials containing treated carbon fibers as detailed herein can be combined with two outer layers prepared as described in U.S. Pat. Nos. 10,167,230; 10,167,231; 10,167,232; and 10,227,259.

Cementitious construction materials of the present invention are also suitable for use in structural and decorative laminates. These laminates may include an outer, waterproof layer surrounding an inner layer of the inventive cementitious construction material having advantageous moisture-resisting properties. Laminates of the present invention may also include an outer, decorative layer surrounding an inner layer of the inventive cementitious construction material. Other construction materials of the present invention include flooring material including, for example, luxury vinyl tile and luxury vinyl plank. More generally, various embodiments of the present invention are directed to decorative magnesium oxide boards. For example, various embodiments are directed to decorative material for ceilings, floors, and interior walls.

Cementitious construction materials of the present invention exhibit advantageous water and water vapor permeability. In various embodiments, the cementitious construction material is permeable to liquid water and water vapor. If a waterproof membrane is applied, the construction material then becomes waterproof, while the cementitious construction material remains water vapor permeable. In this manner, cementitious construction material of the present invention can provide effective moisture management.

Cementitious construction materials of the present invention are also suitable for use in flooring applications, including decorative flooring and also in other decorative forms that are not flooring.

In accordance with certain embodiments of the present invention, it has been discovered that incorporation of carbon fibers having particular properties and/or in a particular manner provide cementitious material and cementitious construction material that are useful for a variety of applications and exhibit advantageous properties. For example, it has been discovered that light weight (i.e., relatively low density) construction materials such as boards can be prepared that nonetheless provide acceptable, if not superior strength as compared to previous MOC construction materials, as measured by flexural strength, tensile strength, impact strength, screw pull through, and/or lateral screw pull as detailed in ICC-ES AC 386 (Acceptance Criteria for Fiber-Reinforced Magnesium-Oxide-Based Sheets). Furthermore, specific flexural strength, and specific lateral screw pull that account for the changes in density provide significant performance enhancements.

In accordance with some embodiments of the present invention, it has also been discovered that the incorporation of a siliconate provides a cementitious material and cementitious construction material that is useful for a variety of applications and exhibit advantageous properties. For example, it has been discovered that light weight (i.e., relatively low density) construction materials such as boards can be prepared that nonetheless provide acceptable, if not superior strength as compared to previous MOC construction materials, as measured by flexural strength, tensile strength, impact strength, screw pull through, and/or lateral screw pull as detailed in ICC-ES AC 386 (Acceptance Criteria for Fiber-Reinforced Magnesium-Oxide-Based Sheets). Furthermore, specific flexural strength, and specific lateral screw pull that account for the changes in density provide significant performance enhancements.

Further advantageously, the properties of the cementitious material and construction material provided by the carbon fibers may be combined with the improved cementitious material that is a precursor of a magnesium oxychloride cement prepared in accordance with the method detailed herein that exhibits advantageous properties irrespective of carbon fiber addition.

When combined and allowed to react, magnesium oxide and magnesium chloride form an amorphous phase. Addition of a stabilizing material (e.g., phosphorous acid and/or phosphoric acid) to the amorphous phase precedes curing and crystallization of a portion of the amorphous phase, while simultaneously forming a nano-molecular veneer encapsulating the crystallized portion of the amorphous phase. The nano-molecular veneer may also be described as a phosphorus-containing protective layer. Since the amorphous protective layer has reduced water solubility, it is not susceptible to moisture or dissolution in water at elevated temperatures.

Overall, the cementitious material of the present invention provides increased cement stability when submerged in water, including at temperatures up to 60° C. This warm water stability is particularly advantageous in that it provides increased stability in environments with high temperatures and high moisture.

Without being bound by the theory, the protective layer including the nano-molecular veneer is believed to exhibit various other advantageous properties. For example, the veneer, or layer does not contain detectable magnesium phosphate by routine test methods, thereby confirming the presence of the nanomolecular veneer. As compared to veneer-free crystallized portions the layer provides about 2% to about 49% increase in surface area, thus further confirming the presence of the nanomolecular veneer. Furthermore, the crystallized portion with the nano-molecular veneer is configured to resist degradation in water having a temperature at 60° C. for 48 hours. Further advantageously, the cementitious construction material consisting of a crystallized portion with a nano-molecular veneer is substantially free of crystalline silica.

Without being bound by the theory, the present invention is believed to stabilize the concrete thereby reducing the corrosion effects on other building materials in the assembly.

Also, without being bound by the theory, the present invention is also believed to have an improved water tolerance over other types of magnesium oxychloride cements without adding polymers or other sealants that can sacrifice some of the excellent fire-resistant properties of magnesium oxychloride cements.

The inventive and unexpected amorphous layer that protects the magnesium oxychloride cement crystals is less detrimental to the structural strength of the cement product than other uses of phosphoric compounds have proven to be.

Benefits of the present invention are believed to include an increased cement stability when submerged in water at temperatures up to 60° C., a physical property that determines warm water stability for the above cement, and the need for no additional time as compared to previous process for preparing cementitious construction materials.

The invention generally relates to a process for making an ultrastable cementitious material with nano-molecular veneer and an ultrastable cementitious material with nano-molecular veneer.

The present invention also generally relates to cementitious construction materials prepared by curing the cementitious material.

The invention further relates to the formation of a tile backer board consisting of a crystallized portion with an amorphous nano-molecular veneer substantially free of crystalline silica. In certain embodiments, the present invention is directed to the formation of a tile backer board comprising a cementitious material as described herein poured over a reinforcing component.

Benefits of the tile backer board of the present invention include increased cement stability when submerged in water at temperatures up to 60° C. Without being bound by the theory, it is believed that the present invention provides a tile backer board with a protective layer that is not susceptible to moisture or water dissolving at elevated temperatures.

Cement/Cementitious Material and Process for its Preparation

The term "cementitious material" as used herein refers to a precursor of a magnesium oxychloride cement material, which include magnesium oxide, magnesium chloride, and a stabilizing material containing a phosphorus-containing compound (e.g., phosphoric acid and/or phosphorous acid). This cement/cementitious material can include the components used for forming magnesium oxychloride cement and, optionally, may include other additives, such as various aggregate components. When referring to "cementitious" or "cement" material it is to be understood this refers to the cement material that has not been cured and/or formed into a form for use. "Cementitious construction material" when referred to herein is intended to refer to a final cured cement material that typically includes other components such as aggregates, reinforcing material, laminates, etc. The cementitious construction material of the present invention includes magnesium oxychloride and may also include magnesium oxychloride crystals, including those at least partially surrounded by a phosphorus-containing stabilizing layer that may be in the form of a nano-molecular veneer. When referring to "magnesium oxychloride cement" is to be understood this references the final cured cement material comprising magnesium oxychloride.

As described in further detail below, in certain embodiments of the present invention, the process for preparing the cementitious material comprises blending magnesium oxide and a magnesium chloride solution to form a liquid mixture that will cure to form magnesium oxychloride, blending treated carbon fibers into the liquid mixture to achieve a desired consistency, dispersion, and density, and adding other additives to the liquid mixture, such as siliconate to achieve desired consistency, dispersion and density. In other embodiments, the process for preparing the cementitious material comprises blending magnesium oxide and a magnesium chloride solution to form a liquid mixture that will cure to form magnesium oxychloride and introducing a siliconate and other additives to the liquid mixture to achieve desired consistency, dispersion and density.

As described in greater detail below, additional components, generally referred to as an "aggregate" may optionally be included.

Initially, in a process for preparing a cementitious material of the present invention, solid magnesium oxide is mixed with an aqueous magnesium chloride solution to form of a liquid mixture. Typically, the magnesium oxide and aqueous magnesium chloride (i.e., a magnesium chloride brine) are combined to provide a weight ratio of $MgO:MgCl_2$ of from about 1.5:1 to about 5:1, from about 1.5:1 to about 4:1, from about 1.5:1 to about 3:1, from about 1.6:1 to about 3:1, from about 1.7:1 to about 3:1, from about 1.8:1 to about 3:1, or from about 1.9:1 to about 2.9:1. In another embodiment, the component are combined to provide a weight ratio of $MgO:MgCl_2$ of from about 2.0:1 to about 5:1, from about 2.0:1 to about 4:1, from about 2.0:1 to about 3:1, from about 2.0:1 to about 2.9:1, from about 2.0:1 to about 2.8:1, from about 2.0:1 to about 2.7:1, or from about 2.0:1 to about 2.6:1. The ranges, concentrations, proportions, ratios, etc. specified here and elsewhere herein are exemplary and the precise concentrations, ratios, etc. will depend on the particular circumstances. In one embodiment, the process may be generally governed by the goal of providing MgO, $MgCl_2$, and water in a stoichiometric molar ratio of 5:1:13.

The magnesium oxide is typically in the form of a dry powder having a magnesium oxide content of from about 70 wt % to about 99.9 wt %, from about 75 wt % to about 99.9 wt %, from about 80 wt % to about 99.9 wt %, or from about 80 wt % to about 99.5 wt %. In another embodiment, the magnesium oxide is in the form of a dry powder having a magnesium oxide content of from about 65 wt % to about 99 wt %, from about 70 wt % to about 99 wt %, from about 75 wt % to about 99 wt %, from about 76 wt % to about 99 wt %, from about 78 wt % to about 99 wt %, from about 80 wt % to about 99 wt %, from about 82 wt % to about 99 wt %, or from about 82 wt % to about 98 wt %.

Generally, the magnesium oxide has a surface area ranging from about 5 m²/g to about 50 m²/g and an average particle size ranging from about 0.3 to about 90 microns wherein more than about 90% by weight magnesium oxide particles are less than or equal to about 40 microns.

Typically, the amount of magnesium oxide utilized is selected to achieve a total magnesium oxide content of from about 28 wt % to about 40 wt %, or from about 30 wt % to about 38 wt % based on a final total weight of the cementitious material.

The aqueous magnesium chloride is generally in the form of a solution. For example, the magnesium chloride may be in the form of a solution comprising from about 20 wt % to about 30 wt %, from about 21 wt % to about 30 wt %, from about 22 wt % to about 30 wt %, from about 23 wt % to about 30 wt %, from about 23 wt % to about 29 wt %, or from about 23 wt % to about 28 wt % magnesium chloride in water. In certain embodiments, the water and magnesium chloride are present in a weight ratio of from about 10:1 to about 20:1, from about 11:1 to about 20:1, from about 12:1 to about 20:1, from about 13:1 to about 20:1, from about 13:1 to about 19:1 from about 13:1 to about 18:1, or from about 13:1 to about 17:1.

The magnesium chloride solution is generally utilized in a proportion suitable to provide a total magnesium chloride content of from about 50 wt % to about 70 wt %, from about 52 wt % to about 70 wt %, from about 54 wt % to about 70 wt %, from about 56 wt % to about 70 wt %, from about 56 wt % to about 69 wt %, from about 56 wt % to about 68 wt %, or from about 56 wt % to about 67 wt % based on a final total weight of the cementitious material.

The magnesium oxide and the magnesium chloride solution react to form a liquid mixture. Generally, this liquid mixture will crystalize into the solid magnesium oxychloride cement upon curing.

Stabilizing Material

As noted above, the cementitious material of the present invention is directed to a magnesium oxychloride cement material which includes magnesium oxide, magnesium chloride, and a stabilizing material containing a phosphorus-containing compound. Generally, the stabilizing material comprises phosphorous acid ($H_3PO_3$) and/or phosphoric acid ($H_3PO_4$).

In certain embodiments, the stabilizing material is introduced into the liquid suspension of magnesium oxide and the magnesium chloride solution in a proportion such that the stabilizing material concentration, based on the final total weight of the cementitious material, is from about 0.1 wt % to about 10 wt %, from about 0.1 wt % to about 9 wt %, from about 0.1 wt % to about 8 wt %, from about 0.1 wt % to about 7 wt %, from about 0.1 wt % to about 6 wt %, from about 0.1 wt % to about 5 wt %, from about 0.1 wt % to about 4 wt %, from about 0.1 wt % to about 3 wt %, from about 0.1 wt % to about 2 wt %, from about 0.1 wt % to about 1 wt %, from about 0.1 wt % to about 0.8 wt %.

In one embodiment, the stabilizing material introduced into the liquid suspension is an aqueous solution comprising at least about 30 wt %, at least about 35 wt %, at least about 40 wt %, at least about 45 wt %, at least about 50 wt %, or at least about 55 wt % $H_3PO_3$. In another embodiment, the stabilizing material is an aqueous solution comprising from about 40 wt % to about 70 wt %, from about 40 wt % to about 65 wt %, from about 40 wt % to about 60 wt %, from about 45 wt % to about 60 wt %, or from about 45 wt % to about 55 wt % of $H_3PO_3$. In still further embodiments, the stabilizing material is an aqueous solution comprising at least about 30 wt %, at least about 35 wt %, at least about 40 wt %, at least about 45 wt %, at least about 50 wt %, or at least about 55 wt % of $H_3PO_4$. In still further embodiments, the stabilizing material is an aqueous solution comprising from about 40 wt % to about 90 wt %, from about 40 wt % to about 80 wt %, from about 50 wt % to about 80 wt %, from about 55 wt % to about 80 wt %, from about 55 wt % to about 75 wt %, from about 55 wt % to about 70 wt %, or from about 60 wt % to about 70 wt % of $H_3PO_4$.

In some embodiments, the liquid suspension of magnesium oxide and the magnesium chloride solution is allowed to react for a period of time from about 1 minute to about 10 minutes, from about 1 minute to about 9 minutes, from about 1 minute to about 8 minutes, from about 1 minute to about 7 minutes, from about 1 minute to about 6 minutes, from about 1 minute to about 5 minutes, or from about 1 minute to about 4 minutes prior to addition of the stabilizing material.

In further embodiments, following addition of the stabilizing material (i.e., phosphorus-containing compound) to the liquid suspension of magnesium oxide and the magnesium chloride solution, the liquid suspension is allowed to react with the stabilizing material. Generally, the liquid suspension is allowed to react with the stabilizing material for a period of time from about 1 minute to about 10 minutes, from about 1 minute to about 9 minutes, from about 1 minute to about 8 minutes, from about 1 minute to about 7 minutes, from about 1 minute to about 6 minutes, from about 1 minute to about 5 minutes, or from about 1 minute to about 4 minutes.

As detailed herein, following addition and mixing of the stabilizing material into the liquid suspension, the cementitious material is allowed to cure, forming magnesium oxychloride crystals. During this curing, the phosphorus-containing stabilizing material is consumed into a nanomolecular veneer, which increases the surface area of the magnesium oxychloride crystals, typically by from about 2% to about 49%. The nano-molecular elements of the cured nano-molecular veneer are insoluble in water and the cured nano-molecular veneer protects the magnesium oxychloride crystals from degradation. For example, the cured nano-molecular veneer has been observed to protect the crystals of the formed cementitious material from degradation in water at temperatures from about 20° C. to about 60° C. for from about 24 hours to about 56 days.

In certain embodiments, the cementitious construction material (i.e., cured cementitious material) is characterized by one or more of the following: (i) from about 5 wt % to about 50 wt % of a phosphorus-containing amorphous layer, as determined by X-Ray Diffraction (XRD); (ii) a magnesium oxychloride crystal content, after a 24-hour soak in water having a temperature of 60° C., of from about 40 wt % to about 90 wt %, as determined by X-Ray Diffraction; and/or (iii) a BET surface area of from about 20 m²/g to about 30 m²/g. Typically, the cementitious material is substantially free of magnesium phosphate.

For example, the cementitious construction material may comprise from about 5 wt % to about 45 wt %, from about 5 wt % to about 40 wt %, from about 5 wt % to about 35 wt %, from about 5 wt % to about 30 wt %, from about 5 wt % to about 25 wt %, or from about 5 wt % to about 20 wt % of a phosphorus-containing amorphous layer, as determined by X-Ray Diffraction (XRD). In another embodiment, the cementitious construction material may comprise from about 10 wt % to about 50 wt %, from about 15 wt % to about 50 wt %, from about 20 wt % to about 50 wt %, from about 25 wt % to about 50 wt %, from about 30 wt % to about 50 wt %, from about 35 wt % to about 50 wt %, or from about 40 wt % to about 50 wt % of a phosphorus-containing amorphous layer, as determined by X-Ray Diffraction (XRD).

In one embodiment, the construction material may comprise a magnesium oxychloride crystal content, after a 24-hour soak in water having a temperature of 60° C., as determined by X-Ray Diffraction, of from about 45 wt % to about 95 wt %, from about 45 wt % to about 90 wt %, from about 50 wt % to about 90 wt %, from about 55 wt % to about 90 wt %, from about 60 wt % to about 90 wt %, from about 65 wt % to about 90 wt %, from about 65 wt % to about 85 wt %, from about 65 wt % to about 80 wt %, or from about 65 wt % to about 75 wt %. In another embodiment, the construction material may comprise a magnesium oxychloride crystal content, after a 24-hour soak in water having a temperature of 60° C., as determined by X-Ray Diffraction, of from about 4 wt % to about 50 wt %, from about 6 wt % to about 50 wt %, from about 8 wt % to about 50 wt %, from about 10 wt % to about 50 wt %, from about 15 wt % to about 50 wt %, from about 20 wt % to about 50 wt %, from about 25 wt % to about 50 wt %, from about 30 wt % to about 50 wt %, from about 35 wt % to about 50 wt %, or from about 40 wt % to about 50 wt %. In a further embodiment, the construction material may comprise a magnesium oxychloride crystal content, after a 24-hour soak in water having a temperature of 60° C., as determined by X-Ray Diffraction, of from about 2 wt % to about 50 wt %, from about 2 wt % to about 45 wt %, from about 2 wt % to about 40 wt %, from about 2 wt % to about 35 wt %, from about 2 wt % to about 30 wt %, from about 2 wt % to about 25 wt %, from about 2 wt % to about 20 wt %, from about 2 wt % to about 15 wt %, from about 2 wt % to about 10 wt %, from about 2 wt % to about 8 wt %, from about 2 wt % to about 6 wt %, or from about 2 wt % to about 4 wt %.

In still further embodiments, the cementitious construction material may comprise a BET surface area of from about 22 m²/g to about 30 m²/g, from about 24 m²/g to about 30 m²/g, from about 26 m²/g to about 30 m²/g, or from about 28 m²/g to about 30 m²/g. In another embodiment, the cementitious construction material may comprise a BET surface area of from about 20 m²/g to about 28 m²/g, from about 20 m²/g to about 26 m²/g, from about 20 m²/g to about 24 m²/g, or from about 20 m²/g to about 22 m²/g.

Carbon Fiber

In accordance with one embodiment of the present invention, it has been discovered that adding carbon fibers to the liquid mixture formed from combining magnesium oxide and magnesium chloride results in a cementitious material that when cured provides a cementitious construction material exhibiting advantageous properties. Along with the advantageous properties provided by the magnesium oxychloride, the presence of these carbon fibers is currently believed to provide a cementitious construction material exhibiting one or more desired property, such as density, weight, etc.

In certain embodiments of the present invention, the carbon fibers introduced into the liquid mixture are treated carbon fibers comprising a dispersing agent at least partially coating the carbon fiber.

Generally, the dispersing agent may be any dispersing agent that is suitable for wet-lay applications and capable of compatibilizing a hydrophobic component such as the carbon fiber in a hydrophilic matrix. For example, suitable dispersing agents are typically hydrophilic or water-soluble or water-dispersible materials and may be selected from the group consisting of anionic, cationic, zwitterionic and non-ionic surfactants, anti-static or polymers, and combinations thereof. However, the dispersing agent applied to the carbon fibers must be selected such that it does not significantly interfere with the reaction between magnesium oxide and magnesium chloride and subsequent crystallization upon addition of the phosphorus-containing stabilizing material. Further, the dispersing agent must be capable of combatibilizing the hydrophobic carbon fibers within a magnesium oxychloride precursor mixture at relatively low loadings. In accordance with various embodiments, the dispersing agent used to treat the carbon fibers comprises a nonionic component, an anionic component or a blend of non-ionic and anionic components, wherein, for example, a phosphate ionic group or similar moiety is utilized to provide the anionic nature. In certain embodiments, the dispersing agent comprises a hydrophilic component such as a hydrophilic oil-based finish.

Non-limiting examples of suitable dispersing agents include Lurol PP-912, Lurol 100, Lurol PS-13460, Lurol PS-13253 (commercially available from Goulston Technologies, Inc.) and mixtures thereof.

In some embodiments, the dispersing agent may constitute at least about 0.5 wt. %, at least about 0.75 wt. %, at least about 1.0 wt. %, at least about 1.25 wt. %, at least about 1.5 wt. %, or at least about 1.75 wt. % of the total weight of the treated carbon fibers. In another embodiment, the dispersing agent may constitute from about 0.5 wt. % to about 5 wt. %, from about 0.5 wt. % to about 4 wt. %, from about 0.5 wt. % to about 3 wt. %, from about 1.0 wt. % to about 3 wt. %, or from about 1.5 wt. % to about 3 wt. % of the total weight of the treated carbon fibers.

In certain embodiments, the carbon fiber and dispersing agent can be separately introduced into the liquid mixture. In such embodiments, the weight ratio of carbon fiber to dispersing agent blended into the liquid mixture is about 1:1 or greater, about 2:1 or greater, about 4:1 or greater, about 6:1 or greater, about 8:1 or greater, about 10:1 or greater, about 15:1 or greater, or about 20:1 or greater. In another embodiment, the weight ratio of carbon fiber to dispersing agent blended into the liquid mixture is from about 0.1:1 to about 20:1, from about 0.1:1 to about 15:1, from about 0.1:1 to about 10:1, from about 0.5:1 to about 10:1, from about 1:1 to about 10:1, or from about 1.5:1 to about 10:1.

Generally, the carbon fibers (whether treated or untreated) have a largest dimension greater than about 3 mm. For example, in one embodiment the carbon fibers have a largest dimension of greater than about 4 mm, greater than about 5 mm, greater than about 8 mm, greater than about 10 mm, greater than about 12 mm, greater than about 15 mm, or greater than about 20 mm. Generally, the upper limit for the largest dimension of the carbon fibers is that which allows for acceptable dispersion throughout the cementitious material and resulting cured cementitious construction material. In various embodiments, the carbon fibers may have a largest dimension of from about 3 mm to about 25 mm, from about 3 mm to about 20 mm, from about 4 mm to about 15 mm, or from about 4 mm to about 12 mm.

Along with a largest dimension (i.e., length), the carbon fibers also have a diameter dimension. A further characteristic of carbon fibers suitable for use in the present invention is the aspect ratio (the ratio of the length, i.e., longest dimension, to the diameter). In certain embodiments, the aspect ratio of carbon fibers suitable for use in the present invention is at least about 250, at least about 300, at least about 350, at least about 400, or at least about 425.

Various carbon fibers may be utilized in accordance with the present invention. For example, the carbon fibers may be selected from the group consisting of grade A carbon fiber, grade B carbon fiber, standard modulus carbon fiber, intermediate modulus carbon fiber, high modulus carbon fiber, ultra-high modulus carbon fiber, recycled carbon fiber and mixtures thereof.

The manner of addition of the carbon fiber is not believed to be critical and may be added all at once or metered into the liquid mixture over a period of time.

The carbon fiber is typically blended into the liquid mixture along with agitation sufficient to disperse the carbon fiber throughout the liquid mixture. Suitable agitation can be provided by blending the carbon fiber into the liquid mixture utilizing an impeller operated at from about 5 Hz to about 70 Hz, from about 10 Hz to about 70 Hz, from about 10 Hz to about 65 Hz, or from about 10 Hz to about 60 Hz.

Typically, the carbon fiber is blended into the liquid mixture for at least about 1 minute, at least about 2 minute, or at least about 3 minutes (e.g., from about 1 to about 10 minutes), depending on the mixer speed. At low speeds, e.g., less than about 20 Hz, the time of mixing could extend beyond about 10 minutes.

Overall, the carbon fiber is blended into the liquid mixture under conditions that provide at least some degree aeration of the liquid mixture to reduce the liquid density and cured board density. It is currently believed that aeration of the liquid mixture promotes formation of a final cementitious construction material exhibiting the desired and advantageous properties. For example, it is currently believed that some degree of aeration of the liquid mixture provides a material having a desirable and/or advantageous density, thereby providing desired performance of the final construction material.

As noted above, one advantage of cementitious material of the present invention containing carbon fiber is providing construction material of relatively low weight and density, while exhibiting suitable and often superior strength and performance properties as compared to other cementitious construction material and other mineral construction materials (e.g., drywall). In accordance with the present invention it has been discovered that achieving a target density of the liquid mixture having the carbon fiber blended therein contributes to the advantageous combination of weight/density and strength and performance of the resulting construction material. Generally, in accordance with the processes of the present invention, the carbon fiber is blended into the liquid mixture until a target density of the liquid mixture of at least about 0.2 g/mL, at least about 0.3 g/mL, at least about 0.4 g/mL, at least about 0.5 g/mL, at least about 0.55 g/mL, or at least about 0.65 g/mL is achieved. In other embodiments, the carbon fiber is blended into the liquid mixture until a target density of the liquid mixture of about 2 g/mL or less, about 1.5 g/mL or less, about 1.4 g/mL or less, about 1.3 g/mL or less, about 1.2 g/mL or less, about 1.1 g/mL or less, about 1 g/mL or less, about 0.9 g/mL or less, about 0.8 g/mL or less, or about 0.7 g/mL or less is achieved. In still further embodiments, the carbon fiber is blended into the liquid mixture until a target density of the liquid mixture of from about 0.5 to about 2 g/mL, from about 0.5 to about 1.5 g/mL, from about 0.5 to about 1.4 g/mL, from about 0.5 to about 1.3 g/mL, from about 0.5 to about 1.2 g/mL, from about 0.5 to about 1.2 g/mL, from about 0.6 to about 1.2 g/mL, or from about 0.6 to about 1.0 g/mL is achieved. In other embodiments, the carbon fiber is blended into the liquid mixture until a target density of the liquid mixture of from about 0.6 g/mL to about 1.3 g/mL.

In accordance with the present invention it has been discovered that the carbon fiber loading impacts performance properties of the resulting cementitious construction material that include but are not limited to flexural strength, lateral screw pull strength, modulus of elasticity (MOE), density and specific properties adjusted for material density and/or thickness. One embodiment of the present invention is directed to cementitious construction materials comprising from about 0.1 wt % to about 0.5 wt %, from about 0.1 wt % to about 0.75 wt %, or from about 0.1 wt % to about 1.0 wt % of carbon fibers. Other embodiments, of the present invention are directed to cementitious construction materials comprising from about 0.3 wt % to about 0.5 wt %, from about 0.3 wt % to about 0.75 wt %, or from about 0.3 wt % to about 1.0 wt % of carbon fibers.

A particularly surprising aspect of the present invention is the relative increase in the desired properties with the addition of relatively low amounts of treated carbon fiber (less than about 1 wt %). Overall, the discovery that utilizing a small percentage of treated carbon fiber (e.g., about 0.5 wt %) provides significant advantages was surprising. Furthermore, it was discovered that property enhancements were greater when the carbon fiber was treated with a dispersing agent (dispersing finish) as compared to an embodiment comprising a combination of untreated carbon fibers and the dispersing agent (dispersion finish) in the liquid mixture. That is, the inclusion of already treated carbon fibers demonstrated a greater improvement in desirable properties than the inclusion of untreated carbon fibers and a dispersing agent into the cementitious material.

Additionally, it was unexpectedly discovered that the property improvements obtained by incorporating lower amounts of carbon fiber (e.g., about 0.5 wt %) were greater than improvements seen when utilising relatively high amounts of glass, aramid, and/or hydrocarbon fiber (e.g., from about 2 wt % to about 3 wt %).

It was observed that once the proportion of carbon fiber reached a certain point, additional benefits were not achieved and, in some cases, the additional amounts may in fact be detrimental to certain properties. Therefore, in various aspects the present invention involves incorporating a relatively low proportion of carbon fibers (i.e., less than about 1 wt %).

Siliconate

Further in accordance with the present invention, it has been discovered that incorporation of a siliconate into the cementitious material of the present invention can be advantageous. Siliconates are generally known for their ability to contribute to water repellency, corrosion resistance, adhesion promotion, increased durability, etc. of a final product. In certain configurations, siliconates have previously been used as a post-processing water treatment or sealant component. That is, as a component added to the surface of an already formed article. In contrast, siliconates are used in embodiments of the present invention in situ during formation of the cementitious material.

In the present invention, the siliconate is generally incorporated into the cementitious material in accordance with the processes described above regarding incorporation of carbon fibers and stabilizing material. It has been observed that incorporating a siliconate provides advantages in terms of the final properties of the construction material in addition to the advantages typically observed. For example, it has been observed that the presence of the siliconate may function as a porosity/pore volume and/or density modifying component. That is, it has been observed that incorporating a siliconate component provides a final cementitious construction material having a high porosity/pore volume and/or lower density as compared to a cementitious construction material prepared without incorporating a siliconate. Without being bound by the theory, it is believed that upon mixing the cementitious material, the siliconate contributes to the entrainment of gas/air in the cementitious material. For example, when the components of the cementitious material are combined under conditions that provide aeration to the mixture, the siliconate may contribute to the entrainment of air within the cementitious material. It may be desirable to entrain gas/air in the cementitious material and resulting cementitious construction material wherein a decreased density is desired. Advantageously, the increase in porosity/pore volume and/or reduction in density are not accompanied by any significant sacrifice in structural strength or performance properties of the siliconate-containing cementitious construction material. For example, the cementitious construction materials described herein comprising a siliconate may exhibit the required structural performance/properties while at the same time being lighter and therefore easier to handle and manipulate, due to the entrained gas/air. A further benefit of a lighter cementitious construction material of the present invention is the reduced cost associated with transportation, storage, etc.

Generally, the siliconate is an organic modified alkali silicate of the formula $R-SiO_3^- M^+$, wherein R is an organic moiety and M is an alkali metal cation. In certain embodiments, R may be an organic moiety selected from the group consisting of a substituted or unsubstituted alkyl, alkenyl, cycloalkyl, aryl, heteroaryl, heterocycle, or arylalkyl. In some embodiments $M^+$ may be selected from the group consisting of lithium, sodium, potassium, rubidium, cesium, and francium. In certain embodiments, $M^+$ is sodium or potassium.

In certain embodiments of the present invention, the siliconate is an alkali metal organosiliconate such as an alkali metal alkylsiliconate or alkali metal phenylsiliconate. For example, the siliconate is selected from the group consisting of sodium methylsiliconate, sodium ethylsiliconate, sodium propylsiliconate, potassium methylsiliconate, potassium ethylsiliconate, potassium propylsiliconate, sodium phenylsiliconate, sodium benzylsiliconate, potassium phenylsiliconate, potassium benzylsiliconate, and combinations thereof. In certain embodiments, the siliconate is selected from the group consisting of sodium methylsiliconate, sodium ethylsiliconate, potassium methylsiliconate, potassium ethylsiliconate, and combinations thereof. In still further embodiments, the siliconate may be selected from sodium trimethyl siliconate or potassium trimethyl siliconate.

Non-limiting examples of suitable siliconates include XIAMETER OFS-0777 Siliconate, XIAMETER OFS-0772 Siliconate (commercially available from Dow Silicones Corporation) and mixtures thereof.

In various embodiments, the siliconate is incorporated along with a stabilizing material, but without carbon fibers being incorporated. In still other embodiments, the siliconate is incorporated along with a stabilizing material and carbon fibers.

One embodiment of the present invention is directed to a cementitious material and the resulting cementitious construction material comprising magnesium oxychloride crystals and a siliconate. Another embodiment of the present invention is directed to a cementitious material and the resulting cementitious construction material comprising magnesium oxychloride crystals, carbon fibers, and a siliconate. A still further embodiment of the present invention is directed to a cementitious material and the resulting cementitious construction material comprising magnesium oxychloride crystals, treated carbon fibers comprising a dispersing agent at least partially coating the carbon fibers, and a siliconate. Additionally, a stabilizing material may be incorporated in any of the above embodiments.

In embodiments directed to processes for making a cementitious material, the siliconate may be introduced into a liquid mixture, wherein the liquid mixture is prepared by blending magnesium oxide and a magnesium chloride solution, thereby reacting the magnesium oxide and magnesium chloride. In certain embodiments, the siliconate may be introduced into the liquid mixture prior to, along with, or after introduction of a stabilizing material.

In certain embodiments of the present invention, the cementitious material comprising from about 0.1 wt % to about 5 wt %, from about 0.1 wt % to about 4 wt %, from about 0.1 wt % to about 3 wt %, from about 0.1 wt % to about 2 wt %, from about 0.1 wt % to about 1.8 wt %, from about 0.1 wt % to about 1.6 wt %, from about 0.1 wt % to about 1.4 wt %, from about 0.1 wt % to about 1.2 wt %, from about 0.1 wt % to about 1 wt %, from about 0.2 wt % to about 1 wt %, from about 0.2 wt % to about 0.8 wt %, or from about 0.4 wt % to about 0.8 wt % of a siliconate.

In certain embodiments of the present invention, the cementitious construction material comprising from about 0.1 wt % to about 5 wt %, from about 0.1 wt % to about 4 wt %, from about 0.1 wt % to about 3 wt %, from about 0.1 wt % to about 2 wt %, from about 0.1 wt % to about 1.8 wt %, from about 0.1 wt % to about 1.6 wt %, from about 0.1 wt % to about 1.4 wt %, from about 0.1 wt % to about 1.2 wt %, from about 0.1 wt % to about 1 wt %, from about 0.2 wt % to about 1 wt %, from about 0.2 wt % to about 0.8 wt %, or from about 0.4 wt % to about 0.8 wt % of a siliconate.

The advantages of the presence of a siliconate are independent of incorporating carbon fibers but, advantageously, may also be combined with the advantages of incorporating carbon fibers discussed above. In certain embodiments, the siliconate is incorporated in a cementitious material and resulting cementitious construction material comprising treated carbon fibers.

Without being bound by the theory, it is also believed that the siliconate contributes to the compatibility and/or dispersing of solid materials incorporated into the cementitious material and resulting cementitious construction material. For example, in embodiments comprising carbon fibers, it is believed that the presence of a siliconate contributes to uniform dispersing of the carbon fibers within the cementitious material and resulting cementitious construction material (i.e., the reduction in "clumping" of carbon fibers within the cementitious construction material). It is believed that this compatibility and/or dispersing effect of the siliconate is present whether the carbon fibers are treated (i.e., at least partially coated with a dispersing agent) or not. It is also believed that the siliconate contributes to this effect even when the solid materials have a large dimension (e.g., carbon fibers having a length greater than about 3 mm, greater than about 4 mm, greater than about 5 mm, greater than about 10 mm, or greater than about 20 mm).

Without being bound by the theory, it is believed that fully mixing the solid components into the liquid mixture prior to the introduction of the siliconate allows for increased utility of the siliconate. If the siliconate is added to the liquid mixture before the solids, the siliconate will interact with the liquid mixture and exhibit less interaction with the solids. If the liquid mixture and solids are not fully mixed prior to the introduction of the siliconate, the siliconate may preferentially interact with the solids and present only localized effects. By fully mixing the liquid mixture and the solids prior to introducing the siliconate, the full effect of the siliconate can be realized and the density of the combination may be controlled (i.e., lowered) as compared to a comparable non-siliconate containing composition.

Further, without being bound by the theory, it is believed that as the loading of solids (e.g., carbon fibers and/or aggregates) increases, the siliconate component surprisingly contributes to a further lowering of the density. That is, as the solids content increases, the benefits of the siliconate are more pronounced.

Aggregate/Additional Components

In certain embodiments, the cementitious material of the present invention may further comprise an aggregate or other additional component. As used herein, the term "aggregate" includes filler or solid material, for example, selected from the group consisting of calcium carbonate, perlite, wood, cellulosic material, chopped fiber, glass, foam beads (e.g., expanded polystyrene beads), recycled magnesium oxychloride, and combinations thereof. In certain embodiments, the cementitious material of the present invention comprises one or more aggregate selected from the group consisting of calcium carbonate, perlite, wood, glass, foam beads (e.g., expanded polystyrene beads), or recycled magnesium oxychloride. In one embodiment, the cementitious material of the present invention comprises calcium carbonate, perlite, wood, glass, foam beads (e.g., expanded polystyrene beads), and recycled magnesium oxychloride. In certain embodiments, the wood may comprise wood flour.

In processes of the present invention for preparing cementitious material and resulting cementitious construction materials comprising treated carbon fibers, the aggregate may be added to the cementitious material with the carbon fibers, after addition of the carbon fibers and before addition of the stabilizing material, with the stabilizing material, or after addition of the stabilizing material.

In processes of the present invention for preparing cementitious material and resulting cementitious construction materials comprising a siliconate, the aggregate may be added to the cementitious material with the siliconate, after addition of the siliconate and before addition of the stabilizing material, with the stabilizing material, or after addition of the stabilizing material.

In certain embodiments, the process for making a cementitious material may comprise blending the solid components (i.e., carbon fibers and/or aggregate materials) into the liquid mixture comprising magnesium oxide and a magnesium chloride solution and fully mixing the components prior to introduction of the siliconate, as described above.

In other embodiments, the liquid mixture and solid components are prepared separately. The solid components may then be subjected to mixing while the liquid mixture is slowly added. In certain embodiments, the stabilizer and/or siliconate component may be added after the separate solid and liquid mixtures are fully combined.

In certain embodiments, the total aggregate is added in a proportion of from about 0.1 wt % to about 45 wt %, from about 0.1 wt % to about 40 wt %, from about 0.1 wt % to about 35 wt %, from about 0.1 wt % to about 30 wt %, from about 0.5 wt % to about 30 wt %, from about 1 wt % to about 30 wt %, from about 5 wt % to about 30 wt %, from about 10 wt % to about 30 wt %, or from about 15 wt % to about 30 wt % of the final weight of cementitious material.

In various embodiments, the aggregate typically comprises particles having a largest dimension (e.g., diameter) of from about 1 nm to about 25 mm, from about 1 nm to about 20 mm, from about 1 nm to about 15 mm, from about 1 nm to about 10 mm, from about 1 nm to about 8 mm, from about 1 nm to about 6 mm, from about 1 nm to about 4 mm, or from about 1 nm to about 2 mm.

Reinforcing Material

A reinforcing material can be added, typically before curing, such that final cementitious construction material includes the reinforcing material. The reinforcing material may be incorporated in a proportion of from about 0.1 wt % to about 30 wt %, from about 0.1 wt % to about 25 wt %, from about 0.1 wt % to about 20 wt %, from about 0.1 wt % to about 15 wt %, from about 0.1 wt % to about 10 wt %, from about 0.1 wt % to about 5 wt %, from about 0.5 wt % to about 5 wt %, or from about 1 wt % to about 5 wt % of the cementitious material.

The reinforcing material can be, for example, a nonwoven or woven silica containing mat, a non-woven, or woven hydrocarbon containing mat. In one embodiment, the reinforcing material can be selected from the group consisting of chopped silica containing fibers, hemp containing fibers, nano-molecular carbon fiber strands, chopped carbon fibers, chopped hydrocarbon fiber, and combinations thereof.

In variations of the cementitious construction material, prior to crystallizing the amorphous phase, an additional substrate can be introduced and coated with the cementitious construction material having oriented strand board, plywood, waterproof membrane, concrete, and wood, and coated with the amorphous phase increasing fire resistance and stability in hot water.

Noncombustible Cementitious Construction Material

Advantageously in accordance with the present invention it has been discovered that various embodiments of the cementitious construction material of the present invention meet the noncombustibility requirements of ASTM E136 (Standard Test Method for Assessing Combustibility of Materials Using a Vertical Tube Furnace at 750° C., as defined in the 2012, 2015 and 2018 IBC Model Codes). In accordance with certain embodiments, the cementitious construction material comprises magnesium oxychloride crystals and/the cement-based construction material has a density of less than about 1.3 g/mL.

Curing

Following incorporating all components of the cementitious material, including the carbon fibers and/or siliconate, optional aggregate, and any optional reinforcing material, the cementitious material is cured under controlled temperature and humidity. For example, the cementitious material may be cured at a temperature between about room temperature (i.e., 20° C.) and 60° C. and a relative humidity of from about 20% to about 70%. Curing typically involves pouring the uncured material onto a mold and curing the material to form the cementitious material.

In one embodiment, the curing process typically lasts at least about 60 minutes, at least about 90 minutes, at least about 120 minutes, or at least about 150 minutes. In another embodiment, the curing process lasts from about 60 minutes to about 4 days, from about 60 minutes to about 3 days, from about 60 minutes to about 2 days, from about 60 minutes to about 1 day, from about 60 minutes to about 12 hours, or from about 60 minutes to about 300 minutes.

Cementitious Construction Material

The molded, cured material can be cut or trimmed to a desired size to form a cementitious construction material in the form of a board. Typically, the boards have dimensions of lengths of from about 4 to about 24 feet, widths of from about 6 inches to about 8 feet, and a thickness of from about 0.1 to about 1.5 inches.

The boards formed from curing the material can be the final construction material or it can be incorporated into one of the many arrangements discussed herein.

Performance/Strength Characteristics

As noted above, incorporating carbon fibers is currently believed to provide a combination of lower weight or density board that nonetheless exhibits suitable strength properties, and in some instances superior performance properties. Likewise, incorporating a siliconate with suitable aeration also provides desirable properties. Although reference is made herein to a "board" it is to be understood that the discussion and properties associated with a cured board are equally applicable to cementitious construction materials of other forms.

In certain embodiments, the cured board density is at least about 0.5 g/mL, at least about 0.6 g/mL, at least about 0.7 g/mL, at least about 0.8 g/mL, at least about 0.9 g/mL, at least about 1 g/mL, at least about 1.1 g/mL, at least about 1.2 g/mL, at least about 1.3 g/mL, or at least about 1.4 g/mL. In other embodiments, the cured board density is about 2 g/mL or less, about 1.5 g/mL or less, about 1.4 g/mL or less, about 1.3 g/mL or less, about 1.2 g/mL or less, about 1.1 g/mL or less, about 1 g/mL or less, about 0.9 g/mL or less, about 0.8 g/mL or less, or about 0.7 g/mL or less. In various embodiments, the cured board density is from about 0.5 to about 2 g/mL, from about 0.5 to about 1.5 g/mL, from about 0.5 to about 1.4 g/mL, from about 0.5 to about 1.3 g/mL, from about 0.5 to about 1.2 g/mL, from about 0.5 to about 1 g/mL, from about 0.6 to about 1 g/mL, or from about 0.6 to about 0.9 g/mL. In one embodiment, the cured board density is from about 0.6 to about 1.4 g/mL.

The flexural strength of the cured board is typically at least about 2 MPa, at least about 3 MPa, at least about 4 MPa, at least about 5 MPa, at least about 6 MPa, at least about 7 MPa, at least about 8 MPa, at least about 9 MPa, at least about 10 MPa, at least about 12 MPa, at least about 14 MPa, or at least about 16 MPa. More specifically, and consistent with the foregoing discussion, the boards of the present invention exhibit specific (i.e., on a per unit density basis) flexural strengths suitable for construction applications. In one embodiment, the specific flexural strength may be at least about 4 $MPa/(g/cm^3)$, at least about 5 $MPa/(g/cm^3)$, at least about 6 $MPa/(g/cm^3)$, at least about 7 $MPa/(g/cm^3)$, at least about 8 $MPa/(g/cm^3)$, at least about 9 $MPa/(g/cm^3)$, at at least about 10 $MPa/(g/cm^3)$, at least about 15 $MPa/(g/cm^3)$, or at least about 20 $MPa/(g/cm^3)$. For example, the specific flexural strength may be from about 4 $MPa/(g/cm^3)$ to about 25 $MPa/(g/cm^3)$, from about 5 $MPa/(g/cm^3)$ to about 25 $MPa/(g/cm^3)$, from about 5 $MPa/(g/cm^3)$ to about 20 $MPa/(g/cm^3)$, from about 5 $MPa/(g/cm^3)$ to about 15 $MPa/(g/cm^3)$, from about 6 $MPa/(g/cm^3)$ to about 15 $MPa/(g/cm^3)$, from about 7 $MPa/(g/cm^3)$ to about 15 $MPa/(g/cm^3)$, from about 8 $MPa/(g/cm^3)$ to about 15 $MPa/(g/cm^3)$, from about 9 $MPa/(g/cm^3)$ to about 15 $MPa/(g/cm^3)$, or from about 10 $MPa/(g/cm^3)$ to about 15 $MPa/(g/cm^3)$.

Further advantageously, boards of the present invention exhibit robust lateral screw pull strength. In some embodiments, the boards of the present invention exhibit a lateral screw pull strength of at least about 40 lbf/inch, at least about 45 lbf/inch, at least about 50 lbf/inch, at least about 55 lbf/inch, at least about 60 lbf/inch, at least about 70 lbf/inch, at least about 80 lbf/inch, at least about 90 lbf/inch, or at least about 100 lbf/inch. In other embodiments, the boards of the present invention exhibit a lateral screw pull strength of at least about 150 lbf/inch at least about 200 lbf/inch, at least about 250 lbf/inch, at least about 300 lbf/inch, at least about 350 lbf/inch, at least about 400 lbf/inch, at least about 450 lbf/inch, at least about 500 lbf/inch, at least about 550 lbf/inch, or at least about 600 lbf/inch. In another embodiment, the boards exhibit a specific lateral screw pull strength of at least about 150 $lbf/in/(g/cm^3)$, at least about 200 $lbf/in/(g/cm^3)$, at least about 250 $lbf/in/(g/cm^3)$, at least about 300 $lbf/in/(g/cm^3)$, at least about 350 $lbf/in/(g/cm^3)$, at least about 400 $lbf/in/(g/cm^3)$, at least about 450 $lbf/in/(g/cm^3)$, at least about 500 $lbf/in/(g/cm^3)$, at least about 550 $lbf/in/(g/cm^3)$, at least about 600 $lbf/in/(g/cm^3)$, at least about 650 $lbf/in/(g/cm^3)$, at least about 700 $lbf/in/(g/cm^3)$, at least about 750 $lbf/in/(g/cm^3)$, or at least about 800 $lbf/inch/(g/cm^3)$.

In certain embodiments, boards of the present invention may exhibit a brittleness index value (i.e., length of supported span/strain at failure) of about 45 or less, about 40 or less, about 35 or less, about 30 or less, about 25 or less, about 20 or less, about 19 or less, about 18 or less, about 17 or less, about 16 or less, about 15 or less, about 14 or less, about 13 or less, about 12 or less, about 11 or less, about 10 or less, about 9 or less, about 8 or less, about 7 or less, about 6 or less, about 5 or less, or about 4 or less. For example, boards of the present invention may exhibit a brittleness index value from about 2 to about 25, from about 2 to about 20, from about 3 to about 20, from about 3 to about 19, from about 3 to about 18, from about 4 to about 18, from about 5 to about 17, from about 5 to about 16, or from about 5 to about 15.

In some embodiments, boards of the present invention may exhibit a modulus of elasticity of from about 0.5 GPa to about 5 GPa, from about 0.5 GPa to about 5 GPa, from about 0.5 GPa to about 4 GPa, from about 0.5 GPa to about 3.5 GPa, from about 0.5 GPa to about 3 GPa, from about 0.75 GPa to about 3 GPa, from about 1 GPa to about 3 GPa, or from about 1.5 GPa to about 3 GPa.

Certain embodiments of the present invention involve including one or more layers surrounding the board. Generally, such construction material includes a board of the present invention along with one or more layers affixed to one or more surfaces of the board. With reference to FIG. 1, construction material 100 includes a board 101 having a first surface 103, a second surface 105 and an edge 109 between the first surface 103 and second surface 105. Affixed to the first surface 103 is layer 115; affixed to the second surface 105 is layer 120.

In certain embodiments a single layer (e.g., layer 115) is affixed to the board. In other embodiments, both layers (i.e., layers 115 and 120) are affixed to the board.

The layers affixed to the board can be in many different arrangements and for many different performance reasons. In certain embodiments, either or both layers are waterproof layers and may further be vapor-permeable layers. Such layers can include one or more polymeric films, including polyethylene films and/or polypropylene films.

Additionally, or alternatively, either or both of the layers may be fiberglass or include fiberglass along with a polymeric layer (e.g., polypropylene mesh). Further in accordance with the present invention, either or both of the layers may be polypropylene mesh, polyethylene, polyester, or other suitable nonwoven polymer.

Boards of the present invention also may include multiple regions, or layers of cementitious construction material. These multi-layered boards can be prepared by combining uncured cementitious material of different properties (e.g., with and without carbon fibers) and allowing the material of different layers, or regions to cure to form the board.

Figure 2:
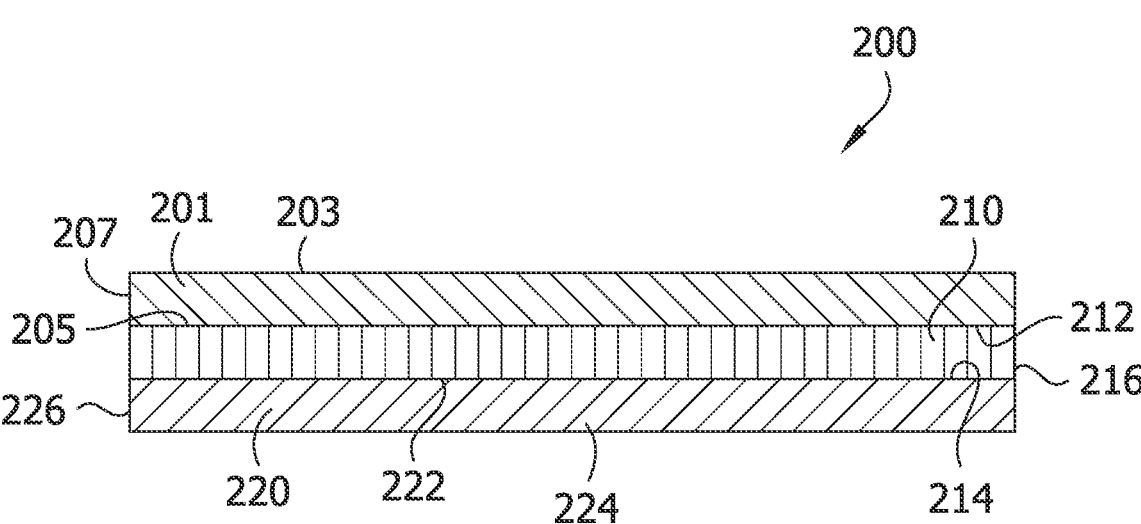

With reference to FIG. 2, board 200 includes a first layer 201, a second layer 210, and a third layer 220. First layer 201 includes an outer surface 203, an inner surface 205, and an edge 207 between the outer surface and inner surface. Second layer 210 includes a first inner surface 212, a second inner surface 214, and an edge 216 between the inner surfaces. Third layer 220 includes an inner surface 222, an outer surface 224, and an edge 226 between the inner surface and the outer surface. As depicted in FIG. 2, the second layer is disposed between the first and third layers and covers the inner surfaces of each of these layers. In various embodiments, each of the layers exhibits one or more different properties. For example, in certain embodiments, one or more layers contains carbon fibers while one or more layers does not contain carbon fibers. Additionally, or alternatively, layers of different cured density may also be combined. For example, a second layer containing carbon fibers may be combined with layers not containing carbon fibers and having a higher cured density.

Moisture Resistance

Advantageously, boards of the present invention exhibit moisture stability, including being stable in water at about 60° C. for from about 24 hours to about 56 days using the Jet Products, LLC Warm Water Stability Test as authenticated by Clemson University Chemical Engineering Department in 2017. Moisture stability allows the boards to be used in warm, humid, and/or hurricane prone climates.

Permeability

Boards of the present invention typically exhibit a permeability of about 2 to about 50 Perm, about 8 to about 30 Perm, or about 10 to about 25 Perm.

As noted above, boards of the present invention may incorporate waterproof, vapor-permeable. This allows preparation of boards that are waterproof to the elements (e.g., rain), but provide moisture management in interior applications though through passage of moisture through the cement material and an interior vapor-permeable layer.

Seismic Resistance

Boards of the present invention exhibit advantageous seismic resistance. For example, boards of the present invention may exhibit a resistance to seismic impact for earthquakes over 3.1. Typically, boards of the present invention are characterized by a seismic rating or force displacement curve that does not include a sharp peak. In this manner, if failure does occur, the boards exhibit a less abrupt failure mechanism, maintaining integrity after the initial mechanical failure. In various embodiments, boards of the present invention maintain about 70% of strength at about a 2.5 inch displacement according to ASTM E72.

Fire Resistance

Boards of the present invention are also fire resistant. Typically, in various embodiments the boards are fireproof along with advantageous seismic resistance.

Tile Backer Board

Boards of the present invention are suitable for incorporation in tile backer boards, including as described in U.S. Pat. Nos. 10,167,230 and 10,167,231, incorporated by reference herein.

Flooring

In various embodiments, boards of the present invention can be used as a substitute for systems that typically includes multi-layer arrangements. For example, in certain embodiments the materials used as boards for flooring are approximately 1-inch thick, and are suitable for replacing multi-layer arrangements that could be up to 3 to 4 inches thick. This is a significant development both in terms of cost and ease of manufacturing.

In certain other embodiments, the present invention may be directed to decorative flooring comprising the cementitious construction material described herein. In one embodiment, the decorative flooring may include multiple layers and be, in total, up to about 1 inch thick, up to about 2 inches thick, up to about 3 inches thick, up to about 4 inches thick, or up to about 5 inches thick. For example, the flooring material may include three layers of about 6 mm, about 12 mm, and about 6 mm in thickness respectively. Cementitious construction materials described herein may constitute one or more of the layers of the multiple layer decorative flooring. For example, flooring materials of the present invention may combine a decorative layer, a noise-dampening layer (e.g., foam and/or cork), along with the cementitious construction materials layer(s).

Volumetric Modular Applications

The cementitious construction material of the present invention is suitable for use in a variety of applications that may be considered modular in nature. Generally, the cementitious construction material is suitable for use in application where the cement material is poured into a mold or formed into a desired shape or arrangement. These include block structures (e.g., similar to conventional cinder block structurers), bricks, brick-like structures (e.g., brick veneers), and structural materials (e.g., I-beams). These and other construction materials such as boards may be formed incorporating a honeycomb-like structural component. In such embodiments, the cement material is typically poured onto and/or around a honeycomb-like supporting material.

Having described the invention in detail, it will be apparent that modifications and variations are possible without departing from the scope of the invention defined in the appended claims.

EXAMPLES

The following non-limiting examples are provided to further illustrate the present invention.

In each of the below examples, the component loadings are reported as a weight percentage of the total cementitious material, including filler/aggregate materials, prior to curing to form the cementitious construction material (i.e., board).

Example 1 is a typical magnesium oxychloride composite board with a medium level of filler/aggregate material which yields a particular cured board density, flexural strength, modulus of elasticity (MOE), lateral screw pull strength, and brittleness index value. Also presented are the specific flexural strength and specific lateral screw pull strength, which accounts for the material density as it is known to impact mechanical properties.

Examples 2-17 are directed to magnesium oxychloride composite boards having varying amounts of carbon fibers, siliconate, and filler/aggregate material. These examples also tested differing carbon fibers and carbon fiber lengths, as well as coated and uncoated carbon fibers.

Examples 2 and 3 demonstrate the effect of adding 0.3 wt % and 0.5 wt % of 6 mm length of treated T800 intermediate modulus carbon fiber, based on the total weight of the cementitious construction material (i.e., magnesium oxychloride composite board), comprising a dispersing agent at least partially coating the carbon fibers. The addition of this carbon fiber results in significant increases in material density (12% and 86% increase), flexural strength (77% and 123% increase), and lateral screw pull (119% and 264% increase). After accounting for the increased density, the increases in specific flexural strength (58% and 20% increase) and specific lateral screw pull (95% and 96%) demonstrate the unique reinforcement behavior of the carbon fiber. It should be noted that the 0.5% carbon fiber loading in Example 3 required decreasing the level of filler/aggregate loading owing to the increased viscosity of the wet mix, which contributed to the observed density increase.

Examples 3-6 illustrate the effect of increasing the level of siliconate for a constant level of treated carbon fiber and filler/aggregate from 0.4% in Example 3 to 2.0% in Example 6. The results demonstrate the ability to achieve a lower density, lightweight composite material with significantly improved specific flexural strength (as high as 89% increase) and specific lateral screw pull (as high as 137% increase).

Examples 7 and 8 demonstrate the ability of the siliconate to contribute to the dispersion of high and low levels of filler/aggregate materials, such that controlled mixing and material processing procedures can be used to yield low density, lightweight magnesium oxychloride composites with increased specific flexural strength and specific lateral screw pull.

Examples 9 and 10 demonstrate the ability to use 12 mm long treated carbon fiber with low filler/aggregate material loading and adjust the concentration of siliconate in order to modify the cured board density from 1.33 g/ml to 0.69 g/ml.

Example 11 demonstrates the ability to use high levels of filler/aggregate material. However, it was observed that the strength enhancements were less pronounced as compared to other examples.

Example 12 did not utilize treated carbon fibers and demonstrates how a carbon fiber lacking a dispersing agent at least partially coating the carbon fibers will suppress the mechanical property enhancements observed in the other examples. It was discovered that the use of a carbon fiber dispersing agent partially coating the carbon fibers enables strength enhancements for both specific flexural strength and specific lateral screw pull.

Examples 13, 14, and 15 demonstrate the ability to use 6 mm long T700 standard modulus carbon fiber to improve the composite properties, albeit with less pronounced improvements than with T800 intermediate modulus carbon fiber. Examples 16 and 17 demonstrate the ability to use 12 mm long T700 standard modulus carbon fiber to improve the composite properties. Examples 13, 14, 15, 16 and 17 generally demonstrate the ability to achieve a decreased cured board density with increasing levels of siliconate, and greater improvements in the composite properties with the use of a carbon fiber dispersing agent.

Examples 18-23 demonstrate the ability of a siliconate component to contribute to the dispersion of filler/aggregates and other solid materials, while allowing for the desired controlled mixing and material processing. The cementitious material (cement) of these examples were found to be low density, lightweight magnesium oxychloride cements. The results of Examples 18-23 demonstrated that, even in the absence of carbon fibers, an improved magnesium oxychloride composite board can be prepared having a low density with acceptable mechanical properties.

| Formulation | Example 1 | Example 2 | Example 3 | Example 4 | Example 5 | Example 6 | Example 7 | Example 8 |
| --- | --- | --- | --- | --- | --- | --- | --- | --- |

-continued

| | | | | | | | | |
|---|---|---|---|---|---|---|---|---|
| Carbon Fiber Modulus | N/A | | | | T800 Intermediate Modulus | | | |
| Carbon Fiber Length | N/A | | | | 6 mm | | | |
| Carbon Fiber Loading | 0.0% | 0.3% | 0.5% | 0.5% | 0.5% | 0.5% | 0.5% | 0.4% |
| Carbon Fiber Dispersing Agent | NA | Yes | Yes | Yes | Yes | Yes | Yes | Yes |
| Siliconate Loading | 0.4% | 0.4% | 0.4% | 0.8% | 1.2% | 2.0% | 0.8% | 0.8% |
| Filler Loading | Medium | Medium | Low | Low | Low | Low | High | Low |
| Perlite | 6.0% | 2.0% | 2.0% | 2.0% | 2.0% | 2.0% | 2.0% | 2.0% |
| Wood flour | 6.0% | 5.0% | 2.5% | 2.5% | 5.0% | 2.5% | 7.6% | 4.0% |
| Expanded Polystyrene (EPS) | 0.0% | 0.0% | 0.0% | 0.0% | 0.0% | 0.0% | 0.1% | 0.0% |
| Phosphoric Acid | 0.4% | 0.2% | 0.4% | 0.4% | 0.4% | 0.4% | 0.4% | 0.4% |
| Measurables | | | | | | | | |
| Cured board density (g/ml) | 0.76 | 0.85 | 1.41 | 0.94 | 0.91 | 0.80 | 0.72 | 0.79 |
| Flexural strength (MPa) | 3.5 | 6.2 | 7.8 | 8.2 | 6.9 | 6.2 | 3.6 | 5.1 |
| Specific Flexural strength (MPa*cm³/g) | 4.6 | 7.3 | 5.5 | 8.7 | 7.6 | 7.8 | 5.0 | 6.5 |
| SFS Percent Increase (%) | 0% | 58% | 20% | 89% | 65% | 68% | 9% | 40% |
| MOE (GPa) | 2.1 | 2.7 | 3.9 | 3.4 | 2.6 | 2.5 | 0.7 | 2.1 |
| Lateral Screw Pull (lbf/inch) | 121 | 265 | 440 | 303 | 344 | 278 | 171 | 190 |
| Specific Lateral Screw Pull (lbf*cm³/inch/g) | 160 | 312 | 313 | 322 | 378 | 348 | 238 | 241 |
| SLSP Percent Increase (%) | 0% | 95% | 96% | 102% | 137% | 118% | 49% | 51% |
| Brittleness index | 20 | 20 | 41 | 21 | 26 | 13 | 9 | 13 |

| Formulation | Example 9 | Example 10 | Example 11 | Example 12 |
|---|---|---|---|---|
| Carbon Fiber Modulus | | T800 Intermediate Modulus | | |
| Carbon Fiber Length | | 12 mm | | |
| Carbon Fiber Loading | 0.5% | 0.5% | 0.5% | 0.5% |
| Carbon Fiber Dispersing Agent | Yes | Yes | Yes | No |
| Siliconate Loading | 0.4% | 0.8% | 0.8% | 0.4% |
| Filler Loading | Low | Low | High | Medium |
| Perlite | 2.0% | 2.0% | 0.0% | 6.0% |
| Wood flour | 2.5% | 2.5% | 7.6% | 6.0% |
| Expanded Polystyrene (EPS) | 0.0% | 0.0% | 0.0% | 0.0% |
| Phosphoric Acid | 0.4% | 0.4% | 0.4% | 0.4% |
| Measurables | | | | |
| Cured board density (g/ml) | 1.33 | 0.69 | 0.71 | 0.85 |
| Flexural strength (MPa) | 8.8 | 6.8 | 3.1 | 6.4 |
| Specific Flexural strength (MPa*cm³/g) | 6.6 | 9.8 | 4.4 | 7.5 |
| SFS Percent Increase (%) | 44% | 112% | −5% | 63% |
| MOE (GPa) | 3.7 | 1.28 | 1.1 | 2.0 |
| Lateral Screw Pull (lbf/inch) | 626 | 280 | 156 | 250 |
| Specific Lateral Screw Pull (lbf*cm³/inch/g) | 470 | 406 | 220 | 294 |
| SLSP Percent Increase (%) | 195% | 154% | 38% | 84% |
| Brittleness index | 30 | 16 | 16 | 24 |

| Formulation | Example 13 | Example 14 | Example 15 | Example 16 | Example 17 |
|---|---|---|---|---|---|
| Carbon Fiber Modulus | | T700 Standard Modulus | | | |
| Carbon Fiber Length | | 6 mm | | 12 mm | |
| Carbon Fiber Loading | 0.5% | 0.5% | 0.5% | 0.5% | 0.5 |
| Carbon Fiber Dispersing Agent | Yes | Yes | No | Yes | No |
| Siliconate Loading | 0.4% | 0.8% | 0.8% | 0.8% | 0.4% |
| Filler Loading | Low | Low | Low | Low | Low |
| Perlite | 2.0% | 2.0% | 2.0% | 2.0% | 2.0% |
| Wood flour | 2.5% | 2.5% | 2.5% | 2.5% | 2.5% |
| Expanded Polystyrene (EPS) | 0.0% | 0.0% | 0.0% | 0.0% | 0.0% |
| Phosphoric Acid | 0.4% | 0.4% | 0.4% | 0.4% | 0.4% |
| Measurables | | | | | |
| Cured board density (g/ml) | 1.36 | 0.79 | 0.77 | 0.75 | 1.30 |
| Flexural strength (MPa) | 8.1 | 6.7 | 6.0 | 5.1 | 8.8 |
| Specific Flexural strength (MPa*cm³/g) | 6.0 | 8.5 | 7.8 | 6.8 | 6.8 |
| SFS Percent Increase (%) | 30% | 84% | 69% | 48% | 48% |
| MOE (GPa) | 3.6 | 2.1 | 1.4 | 1.5 | 2.7 |

-continued

| | | | | | |
|---|---|---|---|---|---|
| Lateral Screw Pull (lbf/inch) | 301 | 214 | 198 | 193 | 268 |
| Specific Lateral Screw Pull (lbf*cm³/inch/g) | 221 | 271 | 257 | 257 | 207 |
| SLSP Percent Increase (%) | 38% | 70% | 61% | 61% | 29% |
| Brittleness index | 19 | 13 | 10 | 10 | 17 |

| Formulation | Example 18 | Example 19 | Example 20 | Example 21 | Example 22 | Example 23 |
|---|---|---|---|---|---|---|
| Siliconate Loading | 0.4% | 0.4% | 0.4% | 0.6% | 0.6% | 0.8% |
| Filler Loading | Medium | Medium | Medium | Medium | Medium | Medium |
| Perlite | 6.0% | 4.0% | 4.0% | 4.0% | 4.0% | 4.0% |
| Wood flour | 6.0% | 8.0% | 8.0% | 8.0% | 8.0% | 8.0% |
| Expanded Polystyrene (EPS) | 0.0% | 0.0% | 0.0% | 0.2% | 0.0% | 0.0% |
| Phosphoric Acid | 0.4% | 0.2% | 0.2% | 0.4% | 0.4% | 0.4% |
| Measurables | | | | | | |
| Board Thickness (mm) | 10 | 10 | 6 | 10.5 | 11 | 6.8 |
| Cement Wet Density (g/ml) | 0.86 | 0.80 | 0.80 | 0.74 | 0.77 | 0.66 |
| Flexural strength (MPa) | 3.5 | 9.4 | 11.4 | 6.2 | 7.7 | 12.8 |
| Specific Flexural strength (MPa*cm³/g) | 4.1 | 11.8 | 14.3 | 8.4 | 10.0 | 19.4 |
| MOE (GPa) | 2.1 | 1.22 | 0.56 | 2.3 | 0.69 | 0.65 |
| Lateral screw pull (lbf) | 64 | 84 | 63 | 79.0 | 45.5 | 44.6 |
| Lateral Screw Pull (lbf/inch) | 121 | 213 | 267 | 191 | 105 | 167 |
| Specific Lateral Screw Pull (lbf*cm³/inch/g) | 141 | 267 | 333 | 258 | 136 | 252 |
| Brittleness index | 20 | 3 | 3 | 11 | 3 | 3 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above without departing from the scope of the invention, it is intended that all matter contained in the above description and shown in the accompanying drawings shall be interpreted as illustrative and not in a limiting sense.

What is claimed is:

1. A cementitious construction material, the cementitious construction material comprising magnesium oxychloride crystals and treated carbon fibers comprising a dispersing agent at least partially coating the carbon fibers, wherein the carbon fibers have a length of from about 4 mm to about 12 mm and an aspect ratio of at least about 250.

2. The cementitious construction material of claim 1, wherein the carbon fibers are hydrophobic carbon fibers and the dispersing agent is a dispersing agent suitable for wet-lay applications and capable of compatibilizing the hydrophobic carbon fibers in a hydrophilic matrix.

3. The cementitious construction material of claim 1, wherein the dispersing agent is selected from the group consisting of a nonionic component, an anionic component or a blend of non-ionic and anionic components.

4. The cementitious construction material of claim 1, wherein the carbon fibers are grade A fibers, grade B fibers, standard modulus fibers, intermediate modulus fibers, high modulus fiber, ultra-high modulus fibers, recycled fibers, or a mixture thereof.

5. The cementitious construction material of claim 1, wherein the cementitious construction material is characterized by one or more of the following:

from about 5 wt % to about 50 wt % of a phosphorus-containing amorphous layer, as determined by X-Ray Diffraction; and/or a magnesium oxychloride crystal content, after a 24-hour soak in water having a temperature of 60° C., of from about 40 wt % to about 90 wt %, as determined by X-Ray Diffraction; and/or a BET surface area of from about 20 m²/g to about 30 m²/g.

6. A cementitious construction material of claim 1, the construction material in the form of a board having a first surface, a second surface and at least one edge extending between the first surface and second surface.

7. A cementitious construction material of claim 1, the construction material in the form of a board having a first surface, a second surface and at least one edge extending between the first surface and second surface, the board further comprising a first layer covering the first surface and a second layer covering the second surface.

8. A board having a length, a width, and a thickness, wherein the board is constructed from a cementitious construction material of claim 1, and wherein the board is characterized by one or more of the following:

a cured board density of from about 0.6 to about 1.3 g/mL;

a flexural strength of at least about 2 MPa;

a specific flexural strength of at least about 4 MPa/(g/cm³);

a lateral screw pull strength of at least about 40 lbf/inch; and/or a specific lateral screw pull strength of at least about 150 lbf/in/(g/cm³).

9. A flooring laminate, the laminate comprising:

a core layer having a first surface having a length and a width, a second surface having a length and a width, and at least one edge extending between the first surface and the second surface, wherein the core layer comprises a cementitious construction material of claim 1, wherein the cementitious board has a density of from about 0.6 g/mL to about 1.3 g/mL; and a decorative layer secured to the first surface of the core layer.

10. A decorative board, the board having a first surface, a second surface, and at least one edge extending between the first surface and second surface, wherein the board comprises a cementitious construction material as set forth in claim 1.

11. A flooring material, wherein the flooring material is selected from vinyl tile and vinyl plank and comprises a cementitious construction material as set forth in claim 1.

12. The cementitious construction material of claim 1, wherein the dispersing agent constitutes from about 0.5 wt. % to about 5 wt. % of the total weight of the treated carbon fibers.

13. The cementitious construction material of claim 1, wherein the material further comprises a stabilizing material selected from the group consisting of phosphorous acid ($H_3PO_3$), phosphoric acid ($H_3PO_4$) and combinations thereof.

14. The cementitious construction material of claim 1, wherein the carbon fibers constitute from about 0.1 wt % to about 1.0 wt % of the material.

15. The cementitious construction material of claim 13, wherein the magnesium oxychloride crystals are at least partially surrounded by a phosphorus-containing layer.

16. The cementitious construction material of claim 15, wherein the phosphorus-containing amorphous layer is substantially free of crystalline silica.

17. The cementitious construction material of claim 15, wherein the phosphorus-containing amorphous layer is in the form of a nano-molecular veneer comprising non-crystalline, phosphorus-containing species identifiable by elemental analysis utilizing a scanning electron microscope (SEM).

18. A multi-layer structural construction material, the material comprising:

a first layer constructed of cementitious construction material comprising magnesium oxychloride crystals and having an outer surface, an inner surface, and at least one edge between the outer surface and inner surface;

a second layer constructed of cementitious construction material comprising magnesium oxychloride crystals and treated carbon fibers comprising a dispersing agent at least partially coating the carbon fibers having a first inner surface, a second inner surface and at least one edge between the inner surfaces; and a third layer constructed of cementitious construction material comprising magnesium oxychloride crystals and having an outer surface, an inner surface and at least one edge between the outer surface and the inner surface, wherein:

the second layer is disposed between the first layer and the third layer;

the inner surface of the first layer covers the first inner surface of the second layer and the inner surface of the third layer covers the second inner surface of the second layer; and the cured density of the cementitious construction material of the second layer is less than the cured density of the cementitious construction material of the first layer and the third layer.

\* \* \* \* \*